UNITED STATES PATENT OFFICE.

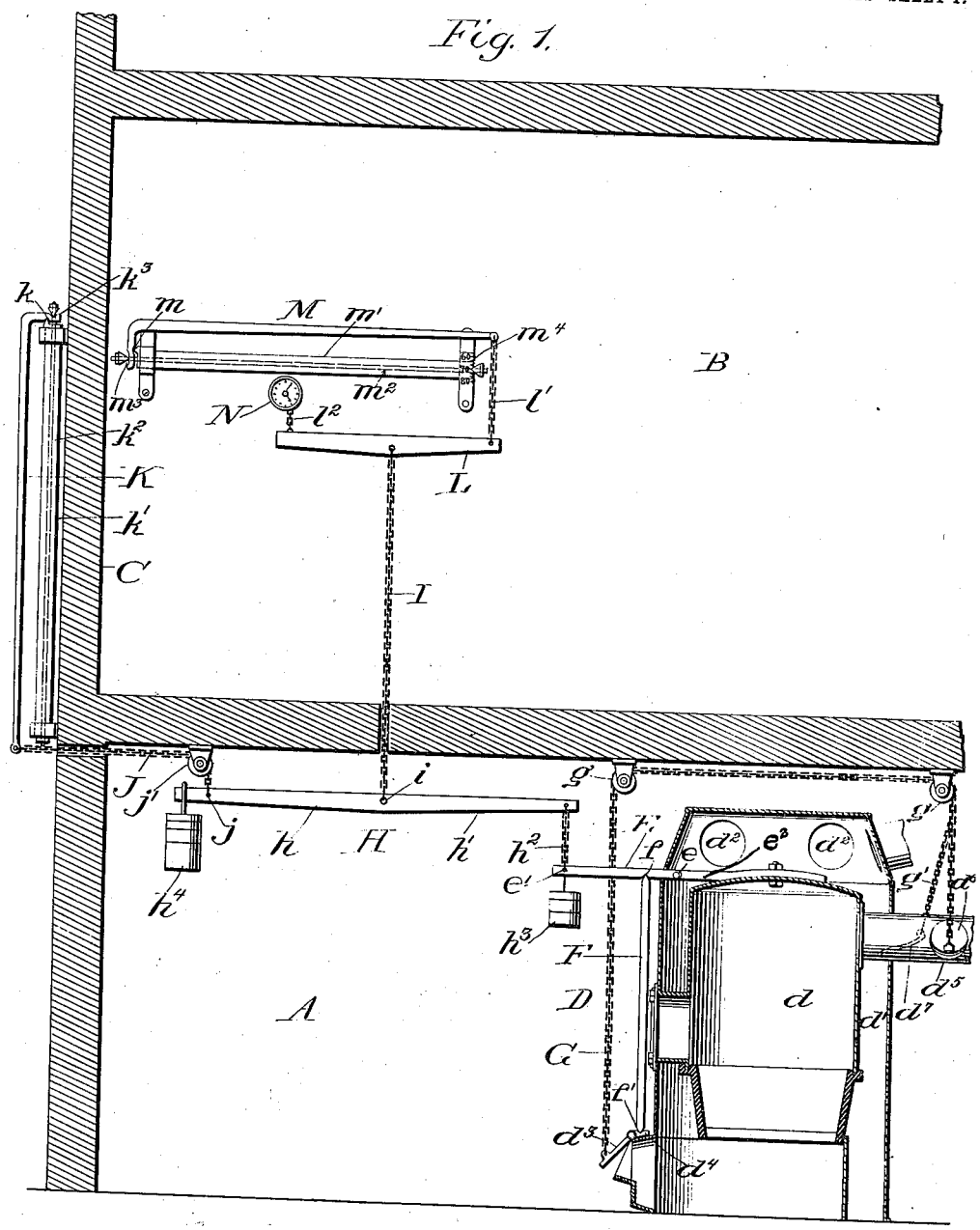

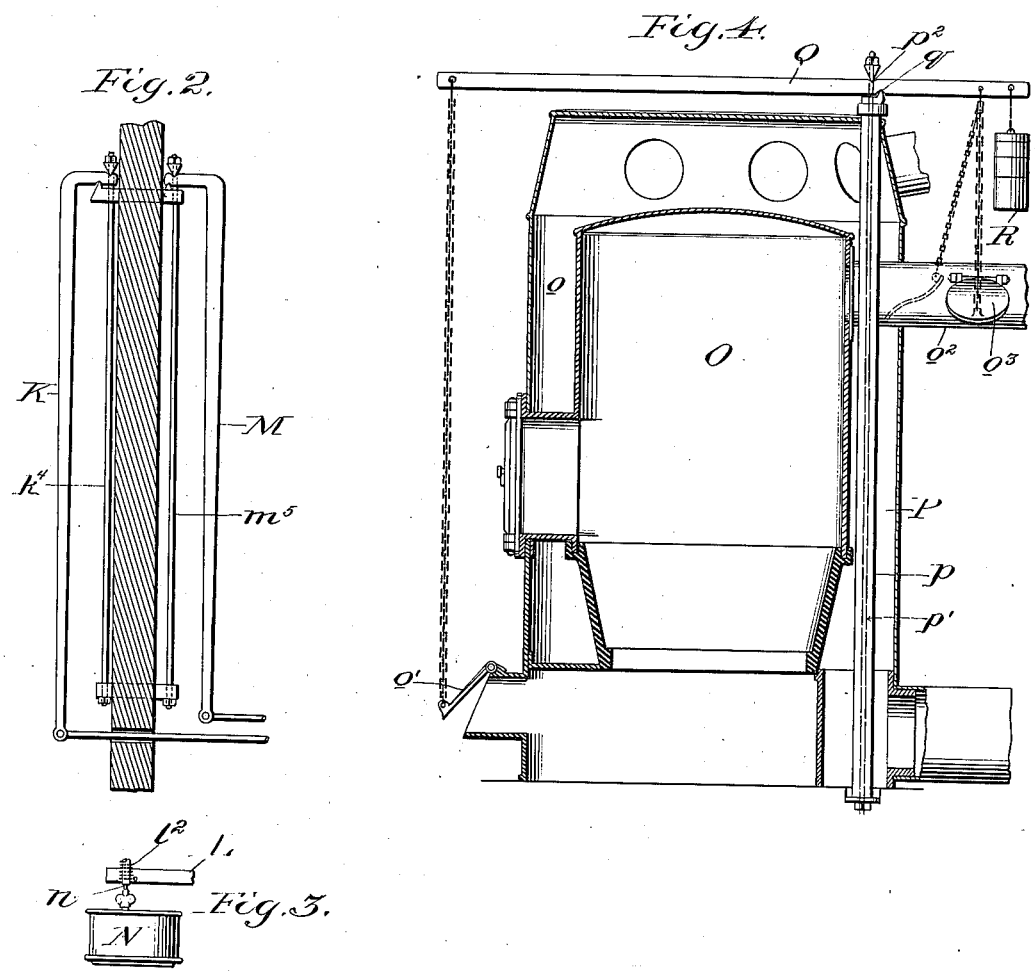

MILTON J. FARQUHAR, OF WILMINGTON, OHIO.

COMPENSATION HEAT-REGULATOR.

963,039.

Specification of Letters Patent.  Patented July 5, 1910.

Application filed February 10, 1905. Serial No. 245,085.

*To all whom it may concern:*

Be it known that I, MILTON J. FARQUHAR, a citizen of the United States, residing at Wilmington, in the county of Clinton and State of Ohio, have invented certain new and useful Improvements in Compensation Heat-Regulators; and I do hereby declare the following to be a full, clear, and exact description of the invention, such as will enable others skilled in the art to which it appertains to make and use the same.

This invention relates to heating apparatus for dwellings or other buildings, and particularly to automatic heat-regulators in governing mechanism for controlling the heater, whether it be a stove or furnace of any of the various types, for preserving a substantially uniform temperature of the house, room or apartments heated.

The main object is to have the heater automatically controlled or governed so as to preserve a uniform temperature of the house notwithstanding changes in the weather or fluctuations in the temperature of the air outside the building. For this purpose I have devised effective compensating governing or regulating mechanism, which maintains a constant temperature of the heater during equable weather, but acts to increase or reduce the temperature of the fire-box inversely according to variations in the outdoor temperature; thus compensating for the influence of the weather upon the house, and keeping the desired indoor temperature constant at all times.

Automatic heat-regulators or self-regulating furnaces have heretofore been in use, governed either directly or indirectly by the fire, controlling the valves, doors or dampers of the fire-box in such manner as to maintain a constant temperature thereof and consequently a substantially uniform temperature of the house for any given outdoor temperature or during a spell of steady weather. But of course the fluctuations of the weather affect the temperature of the house, and hence an actual constant temperature cannot be maintained in the absence of compensating means. These heat-regulators are usually adapted for adjustment, so that they can be set to automatically operate or control the heater for different outside temperatures, as at freezing, cold or moderate weather; and when so adjusted will preserve a practically constant temperature of the fire-box and consequently of the dwelling for the particular spell of weather, provided there are no noticeable variations in the outdoor temperature. But by virtue of my present invention, no manipulative adjustment or resetting of the regulating mechanism is necessary; for, the apparatus having once been installed and properly adjusted (that is set for preserving a certain desired temperature), it is thereafter always automatically self-adjustable to compensate for any and all changes of weather; maintaining a constant temperature of the fire-box for any constant outdoor temperature, but increasing or reducing the temperature of the fire-box inversely in proportion to changes in the temperature of the outside air; thus preserving a uniform temperature of the house during a whole winter or season.

Other features of the invention are: the incorporation with the apparatus of an indoor governor for increasing the precision of adjustment for maintaining the exact temperature desired in the house, and for allowing adjustment or setting of the apparatus for maintaining different constant indoor temperatures; also a time governor for automatically changing the operation of the furnace from one temperature to another at a given hour, as in the early morning when the temperature of the house is desired to be raised; and further, novel improved and effective mechanisms for the furnace-regulator and both the outdoor and indoor governors; together with improvements in the various adjuncts and accessories of the system.

The invention is capable of numerous different specific applications and embodiments, several of which are represented in the accompanying drawings, which form a part of this specification. Without limiting myself, therefore, to the illustrated constructions or any particular embodiment, the invention will be fully described by reference to the drawings and then particularly pointed out and defined in the appended claims.

In said drawings: Figure 1 is a diagrammatic view representing a vertical section through the basement and an upper room of a dwelling, and showing a heater and apparatus embodying my invention installed in the house; the heater in this instance being a hot-air furnace. Fig. 2 is a detail view showing in cross-section a fragment of the vertical outside wall of the house, with outdoor and indoor governors of different form from those shown in Fig. 1. Fig. 3 is a detail view relating to the time governor. Fig. 4 is a vertical section of a hot-air furnace equipped with another form of compensating heat-regulator embodying my invention.

Referring to Fig. 1, A denotes the basement of a house, B an upper room, and C one of the outer walls of the house. In the basement is located a suitable heater, in this instance an ordinary hot-air furnace D with an upright fire-box $d$ and inclosing air-box $d'$. The air taken from the outside into the air-box is heated and distributed to the several rooms to be heated through suitable hot-air flues $d^2$, as well understood. The symbol $d^3$ indicates the ash-door or lower draft-valve, shown hinged at its top and having a short lever-lug or tail-piece $d^4$ projecting above its pivot. The symbol $d^5$ denotes the smoke-flue, leading from the fire-box to the chimney; $d^6$ is a check-valve controlling an opening in said smoke-flue; and $d^7$ is a damper inside the smoke-flue between the fire-box and check-valve and adjacent to the latter.

The furnace may be equipped with any appropriate self-regulating mechanism for automatically controlling its valves or dampers by the temperature of the fire-box. Improved mechanism of very simple construction and effective operation is shown, for operating the valves on the well-known principle of utilizing the expansion and contraction of the fire-box. This illustrated mechanism comprises an arm E projecting out from and shown as an extension of a fixed piece $e^2$ on the top of the fire-box, and a vertically-disposed rod or bar F interposed between said arm and the aforesaid lever-lug or tail-piece $d^4$ of the ash-door $d^3$; also a flexible connection, as the cord or chain G, passing from the ash-door over suitable guide-pulleys $g$ to the check-valve $d^6$, which is hinged and suspended by said chain; the weight of the ash-door being sufficient to open the check-door as the ash-door closes. The rod F is practically non-expanding, by virtue of the shield from the heat afforded by the air-box, the rod being arranged at the outside thereof. Said rod may be attached to the arm E and lug $d^4$, but is preferably provided with knife-edges or fulcrum-points $f$ and $f'$ engaging notches in said parts; thus rendering the rod a push-bar only. If the arm E were rigid, it is evident that the vertical movement of the rod or push-bar F, due to expansion and contraction of the fire-box, would automatically control the valves, and thus maintain a uniform combustion and constant temperature of the fire-box. For, the valves being arranged to maintain a certain temperature, any diminution of this temperature causes contraction of the fire-box, whose motion is imparted through E and F to the lug $d^4$ of the ash-door, thus lifting said door to enlarge the opening thereof and admit more air to increase combustion; the upward movement of the ash-door also allowing the chain G to let down the check valve or restrict the opening thereof. Any increase of temperature causes expansion of the fire-box, allowing the rod F to relax or move upward, thus permitting the ash-door to move downward or close by its own weight, which pulls the cord or chain G to open or enlarge the opening of the check-valve to check or relieve the draft from the fire-box. The damper $d^7$ is simply a transverse plate fitting in the smoke-flue, resting on one end and having its other end raised and sustained by a cord or chain $g'$ connected to the chain G; so that said damper $d^7$ rises and falls with the opening and closing of the check-valve. This is to avoid any reverse current from the check-valve; for in direct draft furnaces of this type it has been found that some of the cold air admitted through the check-valve gravitates back into the fire-box and consumes the fuel from the top. This feature of the invention obviates this objection.

The above explanation of the automatic valve-controlling operation has been based upon the assumption that the arm E is rigid, as indeed it may be where the mechanism so far described is used without a governor or automatic adjuster. However, in the present embodiment, the arm E is not rigid, but it is hinged or pivoted, as at $e$, and its outer free end is held fixed, as at $e'$. Hence the position of the point $e'$ governs the operation of the furnace-regulating mechanism; that is different fixed positions of the point $e'$ allow different contractions of the fire-box before the rod F begins to act upon the ash-door. The arm E, which may therefore be appropriately termed the adjuster-arm, is itself controlled by the weather-governor, the specific illustrated mechanism of which will now be described.

H denotes a lever, in this case a horizontally-disposed beam suspended or fulcrumed at an intermediate point $i$. The outer arm $h$ of said lever is also sustained at a point $j$ near the end by a rope or chain J, which passes over a pulley $j'$ to the weather-governor K outside the building. The opposite or inner end or arm $h'$ of said lever sustains the adjuster-arm E, at the point $e'$, by means of a pendent chain or cord $h^2$, which also sustains a weight $h^3$. This weight acting on the arm E is sufficient to prevent said arm from yielding or raising up its end $e'$ when the contraction of the fire-box exerts force at $f$; and hence insures action of the valve-controlling mechanism, as if the arm E were rigid; except that the adjustment of the point $e'$ affects the operation, as before explained. From the outer arm $h$ of said lever is suspended a greater weight $h^4$, sufficient to more than counter-balance the inner arm $h'$ and its weight $h^3$, but prevented however from affecting the smaller weight by reason of the suspension of the arm $h$ at $j$. The action of the weather-governor K, according to fluctuations of the weather, raises and lowers the point $j$, thus rocking the suspended lever H on its fulcrum or suspension-point $i$, and consequently adjusting the arm E, which determines the temperature at which the fire-box controls its valves. An increase in the outdoor temperature causes the weather-governor to raise the point $j$; a reduction of outdoor temperature causes said governor to lower such point; and thus the weight $h^3$ and point $e'$ are respectively lowered and raised, consequently increasing or retarding the action of the automatic valve-controlling or furnace-regulating mechanism.

The weather-governor K is shown mounted on the outside of the building, or on the wall C. In this instance it comprises a vibratory arm or lever (connected to the cord or chain J which sustains the outer arm $h$ of the suspended lever H), and a bimetallic device for actuating said arm by the differential contraction and expansion of the metals, preferably iron and brass. The lever or arm K is shown having a fulcrum at $k$ on one of the metal members or rods $k'$, and the other rod $k^2$ is connected to $k'$ and adapted to pull at $k^3$ upon a short arm of the vibrating arm or lever K; the tensile rod $k^2$ being the more contractible. The governor need not utilize a bimetallic device, however; for example, the vibratory arm K may be actuated by a single expansible and contractible rod $k^4$ anchored to the wall itself as a practically non-expansible member, as shown in Fig. 2.

In connection with the apparatus thus described, I have included also an indoor governor for increasing the precision of adjustment to maintain the exact temperature desired in the house, and also a time-regulator, or "time draft" as it is sometimes called, for automatically changing from one temperature to another at a given period, as in the early morning when it is desired to raise the temperature of the house. The specific illustrated construction of these governors will now be explained.

L denotes a beam suspended in the upper room B. From this beam the lower beam or lever H is suspended at its point $i$ by a rope, chain or rod I. The beam L is suspended from its opposite ends by the indoor-governor M and the time-governor N.

The indoor governor M may be similar to the outdoor governor; comprising a vibratory arm or lever (which sustains by the cord $l'$ one end of beam L), and a bimetallic device for actuating said arm by differential contraction and expansion.

The letter $m$ denotes the fulcrum of the arm or lever M; $m'$ and $m^2$ are the two metal rods or members, the latter pulling at $m^3$ on M at its fulcrum $m$ on $m'$. The opposite end of the rod $m^2$ is also adjustable with respect to an index $m^4$ to adjust the governor to maintain different temperatures in the room, as sixty, seventy or eighty degrees, for example; the adjustments simply changing the fulcrum $m^3$ of $m^2$ on M, or changing the length of $m^2$ relative to $m'$.

An alternative construction for the indoor governor is illustrated in Fig. 2, where the lever-arm M is shown actuated by a single expansible rod $m^5$ anchored to the wall as a non-expansible member, in the same manner as before explained with reference to a similar alternative construction for the outdoor governor. By means of this mechanism, any fluctuations in the exact temperature of the room will cause an adjustment of the suspension point $i$ of lever H, rocking said lever on its other suspension-point $j$; thus effecting a compensatory adjustment of the heat-regulator.

As to the time-governor N, it may comprise simply an alarm clock, the alarm-winding stem $n$ of which (Fig. 3) is extended and used as a drum for winding up the cord $l^2$ which sustains the other end of the beam L. When the alarm operates at a prearranged hour of the morning, the stem unwinds the cord. This may be utilized in numerous ways to lower the adjuster-arm E and thus increase the draft of the firebox. But I prefer to do it by the connection with the upper beam L, as shown in the drawing.

The operation of the apparatus of Fig. 1 will be fully understood from the foregoing description in connection with the illustration. The simple explanation is this: The weather-governor K controls the position of the adjuster-arm E on the furnace, which in turn controls the action of the valve-regulating mechanism and thus determines the temperature at which the fire-box controls its valves or draft-doors. When the apparatus is installed in a house, and set or adjusted for maintaining a certain desired temperature of the house, the furnace will automatically control its own combustion and temperature by the valve-regulating mechanism, and the influence of the variable outdoor temperature upon the house will be compensated for by the automatic adjustments of the arm E, by means of the weather-governor; said arm E governing the valve-regulating mechanism to cause the furnace to control its drafts at different temperatures, or at higher and lower temperatures inversely in proportion to changes in the outdoor temperature. The indoor governor is a valuable feature in the system because it facilitates nice adjustment of the apparatus for maintaining the exact temperature desired, and also for maintaining different desired constant temperatures; and also because it exerts a compensating influence for any possible fluctuation of temperature of the room, whether caused by the influence of the weather, or from the furnace, or from any indoor causes, such for instance as the presence of lamps in the room.

The fire-controlled governor of the foregoing subject-matter is shown actuated by the expansion and contraction of the fire-box. But numerous modifications of this feature may be availed of; the fire-impelled member being actuated either directly or indirectly by the fire; for examples, by a hot water or hot air pipe held in a non-expanding frame, or by an expansible rod immersed within the hot fluid, whether it be air or water, heated by the stove. Several modifications and alternative constructions will be referred to herein.

The general principles and broad features of the invention having been fully set forth from the foregoing description of the apparatus shown in Fig. 1, the other embodiments will be readily understood from brief description.

Fig. 4 shows a hot-air furnace equipped with a simple but effective compensation governor or regulating-apparatus, of a distinctly different form from that previously shown and described, but embodying the broad features of my invention. In this case the weather-governor is not remote from the furnace, but is incorporated with and in fact forms a part of the fire-governor. A specific explanation is as follows: O denotes the fire-box; $o$ the air-box; $o'$ the ash-door; $o^2$ the smoke-flue; and $o^3$ the check-valve. P is a bimetallic governor, placed upright in the air-box; the lower end of the governor immersed in the cold air where it enters the air-box, and the upper end immersed in the hot air. Q is a lever, actuated by the differential expansion and contraction of the two metal rods or members, $p$ and $p'$. Q is shown fulcrumed at $q$ on $p$, and engaged or pulled at $p^2$ by $p'$ which is connected to the more expansible metal $p$. Said lever is shown having its front arm connected to the ash-door, by either a cord or link; while its rear arm is similarly connected with the check-valve. It is also shown provided with a rear counter-acting weight R, tending to hold the ash-door open and the check-valve closed; since the fulcrum $q$ is in front of $p^2$. By placing $q$ back of $p^2$, and making $p'$ the more expansible metal, the weight R might be omitted. It will be observed that the governor P is influenced both by the fire and the infeeding cold air or weather; and thus effects a compensatory control of the fire-box. Instead of a bimetallic governor, a single expansible rod may be employed for actuating the lever Q, though the construction described is deemed more efficient.

I claim as new and desire to secure by Letters Patent of the United States:

1. A heat-regulating apparatus having, in combination, a heater comprising a fire-box with draft-flues and a valve therefor, and automatic controlling mechanism for said valve governed by the fire, by the outdoor temperature, and by the indoor temperature, for maintaining a uniform indoor temperature.

2. A heat-regulating apparatus having, in combination, a heater comprising a fire-box with draft-flues and a valve therefor, a valve-operating mechanism, and a fire-governed mechanism and a weather-governed mechanism arranged to exert a combined control upon said valve-operating mechanism.

3. A heat regulating apparatus having, in combination, a heater comprising a fire-box with draft-flues and a valve therefor, a valve-operating mechanism, and a fire-governed mechanism and a weather-governed mechanism and an indoor temperature-governed mechanism all arranged to exert a combined control upon said valve-operating mechanism.

4. A heat-regulating apparatus having, in combination, a heater, an automatic combustion-regulator primarily controlled by heat from the heater, an outdoor governor including an expansible member actuated by temperature of the weather, an indoor governor including an expansible member actuated by temperature of the air, and means whereby said governors exert a conjoint influence upon said combustion-regulator.

5. A heat-regulating apparatus having, in combination, a house-heater comprising an expansible fire-box with draft-flues and a valve therefor, a pivotal arm carried by the fire-box and having connection with said valve for controlling the same by expansion and contraction of the fire-box, and a governor including an expansible member influenced by air-temperature and connected with said arm for automatically adjusting the same to cause the fire-box to control the draft at different temperatures.

6. A heat-regulating apparatus having, in combination, a house-heater, a combustion-regulator therefor governed by heat from the heater and susceptible of adjustment for controlling or operating the heater at different temperatures, an outdoor governor actuated by the temperature of the weather, and indoor governor actuated by the indoor temperature, and means whereby said governors exert a conjoint action for automatically changing the adjustment of said regulator.

7. A heat-regulating apparatus having, in combination, a house-heater comprising an expansible fire-box with draft-flues and a valve therefor, a pivotal arm carried by the fire-box and having connection with the valve for controlling the same by expansion and contraction of the fire-box, a lever having a suspended weight connected with said arm for holding it operative, and a governor including an expansible member actuated by air-temperature and connected with said lever for changing the adjustment of said pivotal arm.

8. A heat-regulating apparatus having, in combination, an indoor mechanism actuated to vibrate by the indoor temperature, a lever having an intermediate fulcrum which is sustained by said indoor mechanism and adapted to rise and fall with the movements of said indoor mechanism, an outdoor mechanism actuated to vibrate by the outdoor temperature and sustaining one arm of said lever, a weight on said lever arm, a weight on the other arm insufficient to counter-balance the first-mentioned arm and weight, a heater, a valve-operating mechanism therefor; and means for adjusting said mechanism actuated by the second-named weight.

9. The combination of a stove or furnace, a valve-controlling mechanism therefor mounted on and operated by the expansion and contraction of the stove, an adjusting device for said mechanism, and a weather-actuated mechanism for automatically operating said adjusting device to compensate for fluctuations in the temperature of the weather.

10. The combination of a stove or furnace, a valve-controlling mechanism therefor, an adjusting device for said mechanism, and a weather-actuated mechanism and an indoor-temperature actuated mechanism exerting a conjoint influence for automatically operating said adjusting device to cause the control of the valve at different temperatures.

11. The combination of a stove or furnace, a valve-controlling mechanism therefor, an adjusting device for said mechanism, an intermediately-fulcrumed horizontally-disposed lever, a weight suspended from one arm thereof and connected to said adjusting device for operating the same, a weight on the other arm of said lever sufficient to more than counter-balance the first-named weight, and a temperature-controlled mechanism sustaining the second-named weighted arm of said lever.

12. In a heater, the combination with a furnace, of an outdoor temperature-controlled governor, an indoor temperature-controlled governor, a beam or lever suspended at different points from both governors so as to be adjusted by the operations of said governors, and a damper-controlling mechanism for the furnace operated by the heat from the furnace, said damper-controlling mechanism including an adjustable member operatively-connected with and controlled by said beam or lever.

In testimony whereof I affix my signature, in presence of two witnesses.

MILTON J. FARQUHAR.

Witnesses:
NATHAN M. LINTON,
WALTER T. MCMILLAN.